Feb. 20, 1945. H. W. HALL 2,370,033

LAMINATED ARTICLE AND METHOD OF MANUFACTURE

Filed Nov. 3, 1942

INVENTOR.
Horace W. Hall
BY Harold E. Cole
ATTORNEY

Patented Feb. 20, 1945

2,370,033

UNITED STATES PATENT OFFICE 2,370,033

LAMINATED ARTICLE AND METHOD OF MANUFACTURE

Horace W. Hall, Newton, Mass.

Application November 3, 1942, Serial No. 464,411

13 Claims. (Cl. 144—309)

This invention relates to articles of manufacture made of wood laminations and to the method of manufacturing them.

The principal object of my invention is to permanently and irreversibly unite wood laminations together, using casein glue, so they will remain united under the most extreme and varying conditions of heat and cold, wetness and dryness, severe use, etc.

Another object is to permanently harden or solidify to an unusual degree the outside surface portion or shell of the finished article so that it can withstand hard and unusual shocks, resist penetration, etc.

It is common knowledge that so-called casein glues are not water resistant and thus not suitable for building plywood structures for outdoor uses where exposed to rain, snow, heat, cold and other changing atmospheric conditions.

It is well known that casein glue joints become soft when soaked in water and thus separate because of internal strains set up by subsequent drying. The wet strength of a casein glue joint is very slight and thus the article so glued is not suited for many purposes that it otherwise could be used for if such joint could be made by conversion after gluing to a joint not affected by water.

I am cognizant of recent inventions whereby casein has been combined with urea and formaldehyde and other chemicals to form a suitable adhesive. All these are thermo setting which makes them impracticable for thick built-up plywood structures on account of the difficulty in diffusing heat through wood to any great distance.

It is common knowledge among the manufacturers of glues and other adhesives that a resin glue joint of urea or phenol formaldehyde is brittle and will tend to crack under severe shock, especially if glued to end wood. Certain commercial casein glues I have found much more resistant to shock than the resin glues when bonding wood. This factor makes casein glues much desired where severe shock is to be encountered in the built-up product. The great drawback is its absorption of water and weak wet-strength as compared with the resin glues. Another advantage in using a casein glue in building thick plywood is that it requires no thermo setting whereas resin glues for instance, phenol formaldehyde, or casein resin glues require heat for setting.

My invention among other things relates to the chemical treatment of a hardened casein glue joint in a plywood structure whereby said casein glue joint fuses with the chemicals of plasticization and the chemicals of the wood and the conversion of such a compound into a homogeneous water-resistant and decay-resistant hardened bond of great strength and resistance to severe impact or shock not equalled by the known resin bonds.

The foregoing and other objects which will appear as the nature of the invention is better understood, may be accomplished by a construction, and method of manufacture such as is disclosed by the drawing and specification. The nature of the invention is such as to render it susceptible to various changes and modifications, and, therefore, I am not to be limited to said disclosure; but am entitled to all such changes therefrom as fall within the scope of my claims.

Figure 1:
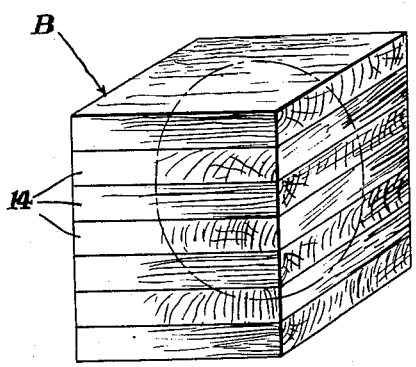
Figure 1 is a perspective view of a block of wood laminations adhesively united together, the dot and dash lines indicating the shape of an oval ball to be cut therefrom.

To illustrate this article of manufacture and method of making it I have chosen the manufacture of a wooden ball such as is used for bowling and the like. However many other articles could likewise be made of various shapes and sizes.

I preferably start with wood laminations 14 such as sap, rock maple one inch thick, planed and dressed on two faces and sanded down to ¾". In the drawing there are seven said wood laminations 14 shown in cross-banded relation to each other to form an oblong block B to start with. I spread a casein glue mixture of 1 part casein to 1.8 parts water on the face surfaces of said laminations 14 and glue up into a solid laminated block and allow the glue joints to harden.

The block B is now turned to elliptical shape preferably with the sharp arcs turned to approximately the finished size of a round ball so that the length of the ball at right angles to the plane of the glue joints is greater than the other dimensions. This allows for compression at right angles to the plane of the glue joints which are parallel to each other. The block B could be shaped to an oblong or otherwise shaped instead of turning it to oval, as it does not necessarily have to assume a particular shape at this stage.

The article is immersed in a solution of urea formaldehyde with water or any other suitable carrier in proportions that do not allow precipitation of the urea formaldehyde. It should soak about 24 hours or longer in the case of water solution, or if under pressure or vacuum or both, from ½ to 1 hour depending upon the carrier and then allowed to slowly dry in order to get proper diffusion into the wood and glue joints, and to avoid prematurely curing or hardening of the urea formaldehyde. The urea formaldehyde solution should penetrate the ball or article to a depth of ⅛" to ½".

The oval ball is now ready for compression between two cast iron cauls 17 and 18, shaped to fit over the said oval ball. These two half cauls are heated gradually up to 300 to 350 degrees F. while the ball is being compressed under pressure of approximately 1,000 lbs. per square inch until said pressure uniformly redensifies the entire wood structure and brings the two semi-circular cauls to within ¼" to ½" of each other, depending upon the size of the ball, whereupon the pressure is maintained; but not further increased until the wood and glue joints become plasticized by the heat. This is evident by the further closing movement of the iron cauls without increased pressure. This plasticization usually occurs within 10 minutes under such heat treatment, longer if less heat is used. Now the pressure is increased to 3,000 or 4,000 lbs. per sq. in., while continuing said heat, until the two iron, semi-spherical cauls come together, and maintained for about 1 hour with pressure. The cauls are then allowed to cool off under this pressure until they reach about 100 F. The ball can then be removed. During this period the plasticized surface portion 16 of the wood and glue joints become converted into an irreversible mass of water insoluble material of great hardness which does not dent under impact by bouncing on concrete or steel and there is no separation of the glue joints after soaking in hot water for 24 hours. This produces a ball that is a perfect sphere of approximately the size desired in a finished ball of greater density throughout than it was originally, having a thin, case-hardened shell or surface portion of wood and composite glue joints of still greater density and consistency than the inside portion of the ball.

If finger holes are required they should be bored now.

The ball is now ready for sanding to final dimension shape which is done by a special turning machine. Then the ball is immersed for 2 to 5 minutes in a solution of paraffine base naphtha and a high melting point paraffine in a proportion of four parts naphtha to one part solid paraffine at a temperature of 100 to 120 degrees F. The ball should likewise be at a temperature around 100 degrees F. which can be accomplished by sanding the ball immediately upon taking it out of the pressure molds and then immediately immersing in the paraffine solution, thus eliminating any special heating step in the process.

The ball is dried at ordinary factory temperatures with good air circulation by fans which will evaporate the naphtha in about ½ hour, and then the final polishing is done on a dry buffing wheel.

Figure 5:
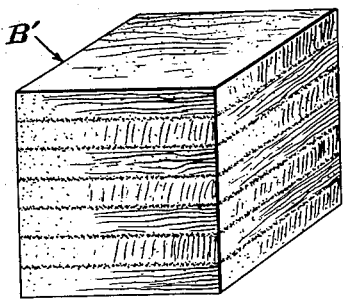
Figure 5 is a perspective view of a said block after it has been compressed throughout and Figure 6 is a sectional view after said block has been rounded and treated with a urea formaldehyde solution.
Figure 2:
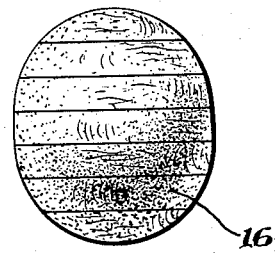
Figure 2 is a front elevational view showing an oval ball which has been turned out of said block and partly permeated with a urea formaldehyde solution.
Figure 6:
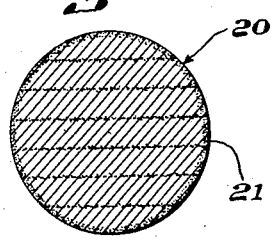
Figure 3:
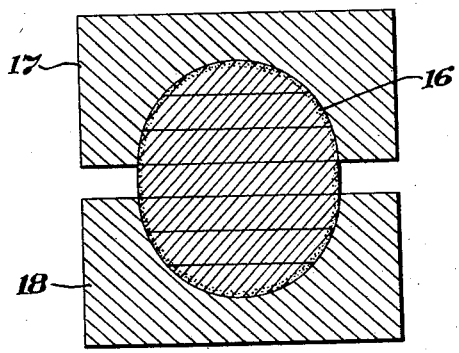
Figure 3 is a cross sectional view illustrating said oval ball between two cauls, ready for heat and pressure to be applied.
Figure 4:
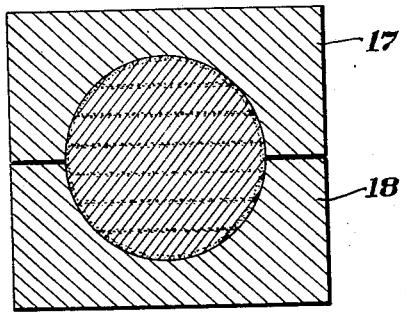
Figure 4 is a sectional view showing the position of the cauls and shape of the ball in completing the pressing operation.

In Figures 5 and 6 a modified method of intermediate steps taken in making the ball is illustrated. Said block B is compressed from its original oblong shape to the shape illustrated by block B' with great pressure—1,000 pounds or more per square inch and then the ball 20 is cut out of it to its final, round shape, although oversize. This compression can be done immediately upon assembling said laminations 15 while the glue is still wet. This process redensifies the wood plies to a constant, uniform density which insures perfect roll to the finished ball and uniform hardness and bounce at all points. After said ball 20 is formed it is immersed in said solution of urea formaldehyde until said solution penetrates as at 21 as previously described. Then it is placed between the said two cauls 17 and 18 and heat is applied for 5 or 10 minutes until the heated shell becomes plastic. Pressure is then increased to 3,000 to 4,000 lbs. per square inch upon said cauls to greatly densify and harden said permeated portion 21 into a smaller ball as heretofore described than the inside portion of the ball.

In making some articles of wood laminations it would not be necessary to compress the whole block in which instance after the block has been impregnated with the urea formaldehyde solution as described it would be placed between the cauls 17 and 18 and when heat had softened said impregnated portion the latter would be densified as previously described, the remainder of the block remaining substantially normal or uncompressed.

What I claim is:

1. A method of manufacturing a laminated wood article comprising applying casein glue on said laminations and uniting them together into a unitary structure, impregnating a portion of said structure, including glue joints, with a urea formaldehyde compound, applying heat and pressure to said structure to thereby compress it into a smaller space, and impregnating a portion of said structure with a solution of a waxy substance such as paraffine in a volatile liquid such as naphtha.

2. A method of manufacturing a laminated wood article comprising applying a casein glue on said laminations and uniting them together into a unitary structure, impregnating a portion of said structure including glue joints with urea formaldehyde, applying heat and pressure to said structure to thereby compress it into a smaller space with the compression at right angles to the glue joints, and impregnating a portion of said structure with a solution of a waxy substance such as paraffine in a volatile liquid such as naphtha while said article is at a higher than ordinary temperature.

3. A method of manufacturing a laminated wood article comprising applying casein glue on said laminations and uniting them together into a unitary structure and compressing the same into a more compact and smaller structure, then shaping said structure to approximately final shape and impregnating the surface portion of said structure including glue joints with urea formaldehyde, and applying heat and pressure to said structure to thereby densify and compress said impregnated portion into a smaller space.

4. A method of manufacturing a laminated wood article comprising applying casein glue on said laminations and uniting them together into a unitary structure, impregnating the outer surface portion of said structure, including glue joints, with urea formaldehyde, applying heat and pressure to said structure until said impregnated surface portion has become more compact.

5. The method of making a wooden ball comprising impregnating the outside surface portion, including the glue joints, of an oval-shaped structure of wood laminations united by casein glue, which has previously set, with a urea resin such as urea formaldehyde, applying heat and pressure to said structure to thereby compress it until said outside portion softens and becomes more compact, then increasing said pressure while continuing said heat until said impregnated portion has become more compact, then reducing said structure to final shape of a ball, and then impregnating the outer surface portion of said ball with a waxy substance.

6. An article of manufacture comprising a plurality of wood laminations adhesively united together with a non-resinous, casein glue, the outer surface portion of said laminations at the glue joints embodying the chemical reaction product of casein and urea formaldehyde, said outer surface portion being harder and denser than the inner portion of said article.

7. An article of manufacture comprising a plurality of wood laminations adhesively united together with a non-resinous, casein adhesive, the outer portion of said article embodying the impregnate product of a urea resin such as urea formaldehyde with part of the adjacent wood structure in which the glue joint of said outer portion embodies the chemical reaction product of said casein glue and the said urea resin.

8. An article of manufacture comprising a plurality of wood laminations adhesively united together with a non-resinous, casein adhesive, the outer portion of said article embodying the impregnate product of urea formaldehyde with part of the adjacent wood structure in which the glue joint of said outer portion embodies the chemical reaction product of said casein glue and the urea formaldehyde.

9. An article of manufacture comprising a plurality of wood laminations adhesively united together with a non-resinous, casein adhesive, the outer portion of said article embodying the impregnate product of a urea resin such as urea formaldehyde with part of the adjacent wood structure in which the glue joint of said outer portion embodies the chemical reaction product of said casein glue and the said urea resin, said outer portion being harder and denser than the inner portion of said article and being substantially waterproof.

10. A method of manufacturing a laminated wood article comprising applying casein glue on said laminations and uniting them together into a unitary structure, allowing said glue to set, impregnating a portion of said structure, including glue joints, with a urea formaldehyde compound, applying heat and pressure to said structure to thereby compress it into a smaller space, and thereafter impregnating a portion of said structure with a waxy substance in a volatile liquid such as naphtha.

11. A method of manufacturing a laminated wood article comprising applying casein glue on said laminations and uniting them together into a unitary structure, then impregnating the outer surface of said structure, including glue joints, with urea formaldehyde, applying pressure and heat to said structure to thereby compress it and plasticize the impregnated portion, and then increasing the pressure and continuing said heat until said impregnated outer surface portion including glue joints has become converted into a more compact and hardened surface.

12. A method of making a ball comprising applying casein glue on wood laminations and uniting them together into a unitary structure, shaping said structure to the general form of an oval ball, impregnating the outer surface portion of said structure, including glue joints, with urea formaldehyde, applying pressure and heat to said structure to thereby make the outer surface portion denser and to compress it into a smaller space and make it substantially round.

13. A method of manufacturing a laminated wood article comprising applying casein glue on said laminations and uniting them together into a unitary structure and compressing the same into a more compact and smaller structure, then shaping said structure to approximately final shape, then impregnating a portion of said structure including glue joints with urea formaldehyde and applying heat and pressure to said impregnated portion of said structure and then increasing the pressure when said portion becomes plastic, to thereby densify and compress said impregnated portion into a still smaller space.

HORACE W. HALL.